United States Patent [19]

Reynolds

[11] Patent Number: 4,700,990
[45] Date of Patent: Oct. 20, 1987

[54] BRAKE PRESSURE CONTROL VALVE

[75] Inventor: Desmond H. J. Reynolds, Sutton Coldfield, England

[73] Assignee: Lucas Industries public limited company, Birmingham, England

[21] Appl. No.: 832,386

[22] Filed: Feb. 24, 1986

[30] Foreign Application Priority Data

Feb. 22, 1985 [GB] United Kingdom ............... 8504636

[51] Int. Cl.⁴ .......................... B60T 8/18; B60T 13/00
[52] U.S. Cl. .................................. 303/6R; 188/195; 303/22R
[58] Field of Search .......... 303/6 R, 6 C, 6 M, 22 R, 303/22 A, 6 A; 267/64.16, 64.17; 188/195, 349

[56] References Cited

U.S. PATENT DOCUMENTS 3,475,059 10/1969 Klein ................................. 303/22 A
4,062,597 12/1977 Sawyer et al. ................. 303/22 R X
4,325,581 4/1982 Pickering ......................... 303/6 C X

FOREIGN PATENT DOCUMENTS 1304350 1/1973 United Kingdom .

Primary Examiner—Andres Kashnikow
Assistant Examiner—Robert J. Oberleitner
Attorney, Agent, or Firm—Scrivener and Clarke

[57] ABSTRACT

A brake pressure control valve (1) for use on a vehicle having a modulated self-levelling air suspension system comprises a valve body (2) sealingly secured to the wall (4) of a pressure chamber of the suspension system to close an aperture (7) in the wall. A brake pressure apportioning valve set (11) is located within the valve body and has a control member (15) the upward force (A) on which determines the cut-in pressure. Fluid pressure within the pressure chamber (5) is communicated to a control chamber (18) via a small orifice (21) in a steel cup (20) which closes the bottom of the valve body. Pressure within control chamber (18) is applied to a diaphragm (20) which permits pressure transfer to a pressure plate (16) abutting the control member (15) but prevents loss of fluid from the control chamber (18).

9 Claims, 1 Drawing Figure

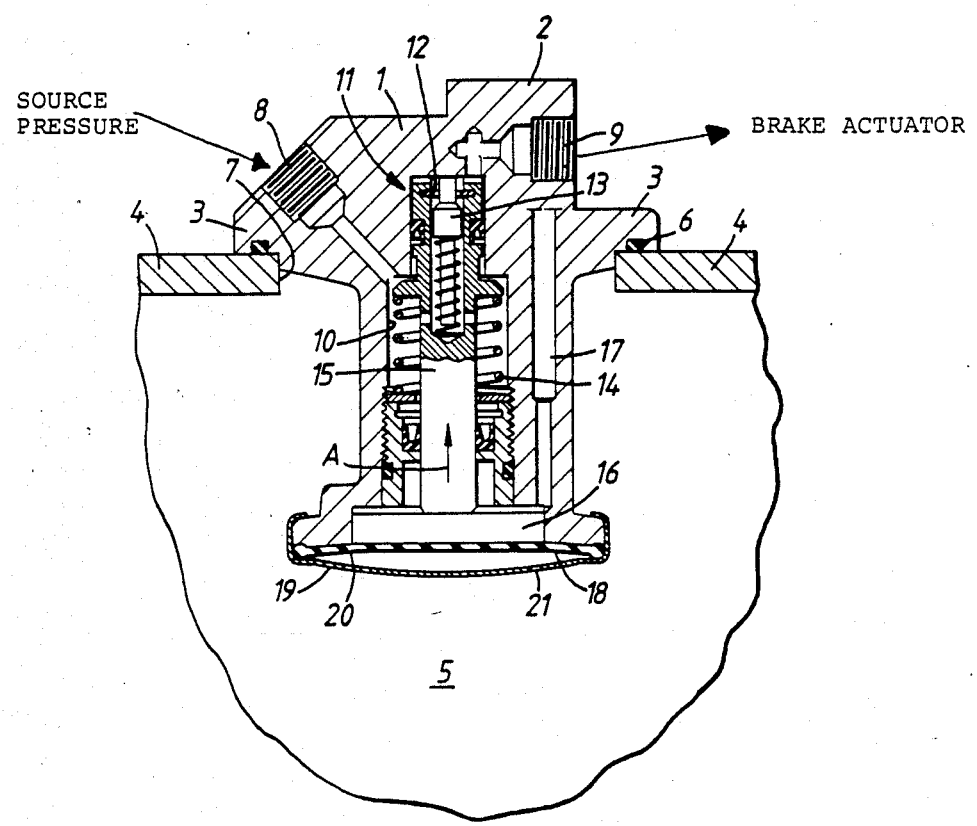

BRAKE PRESSURE CONTROL VALVE

This invention relates to a brake pressure control valve, and more particularly to a brake pressure control valve for use on a vehicle having a pressurized fluid self-levelling suspension system.

If a vehicle is fitted with a self-levelling suspension system brake pressure control valves which operate by detecting the deflection of a suspension spring or by detecting the relative position of a sprung and an unsprung part of the vehicle cannot be used.

There is proposed in our prior British patent No. GB 1304350 a brake pressure control valve suitable for use on a vehicle having a fluid operable self-levelling suspension system. The valves described, however, suffer from the disadvantage that, being separate from the suspension system, they must be connected to the suspension system by suitable tubing. If such tubing, or the end connection associated therewith fails this may result in complete failure of the suspension system. Further, the size of tubing which would generally be used for the purpose of connecting such valves to an associated pressure chamber of the suspension system would provide substantially unrestricted communication between the pressure chamber of the suspension system and the interior of the brake pressure control valves. This will result in fluctuations in suspension pressure due, for example, to undulating road surfaces being transmitted directly to the brake control valves with the undesirable result that the characteristics of the control valve will be modulated in accordance with such variations in suspension system pressure.

According to one aspect of the present invention there is provided a brake pressure control valve for use on a vehicle having a pressurized fluid self-levelling suspension system, the valve comprising: a valve body which, in use, is sealingly secured to the wall of a pressure chamber of the suspension system to close an aperture in the wall whereby a portion of the control valve is exposed to the pressure prevailing within the pressure chamber; a valve set located within the valve body to control communication between an inlet connectable to a source of brake actuating fluid and an outlet connectable to a brake actuator; a control member, exposed to the pressure prevailing within a control chamber defined within the valve body, and coupled to the valve set to render operation of the valve set dependent upon the pressure prevailing within the control chamber; and a small orifice fluidically connecting the control chamber to a point on the surface of the control valve which, in use, is exposed to the pressure prevailing within the pressure chamber.

The term "valve set" as used herein means any combination of valve seat and valve closure member operable to control communication between the inlet and outlet.

The present invention overcomes the problems with the prior art referred to above by locating the body of the brake pressure control valve directly on the wall of a pressure chamber of the suspension system. The valve includes an internal control chamber which is connected to the interior of the pressure chamber by a small orifice. The small orifice has the effect of preventing rapid changes in suspension pressure from being communicated to the control chamber of the valve, and at the same time limits to an acceptable level the maximum loss of fluid from the suspension system should some component of the brake pressure control valve fail and result in loss of fluid from the control chamber.

Preferably, as an additional precaution against the loss of fluid from the suspension system, a flexible diaphragm sealingly engages the valve body and fluidically isolates the control chamber from the internal components of the control valve. As a result, the control member is still subject to the fluid pressure within the control chamber, but is isolated from the control chamber by the diaphragm.

The invention will be better understood from the following description of a preferred embodiment thereof, given by way of example only, reference being had to the accompanying drawing wherein the single FIGURE shows schematically a cross-section through a brake pressure control valve mounted on the wall of the pressure chamber of a self-levelling suspension system.

There is shown in the drawing a brake pressure control valve 1 having a valve body 2 formed with a mounting flange 3 by means of which the valve is mounted on the wall 4 of a pressure chamber 5 of a modulated self-levelling air suspension system. The flange 3 is provided with a seal 6 whereby the valve body sealingly closes an aperture 7 formed in the wall 4, a substantial part of the valve being located within the pressure chamber 5.

The valve body 2 defines an inlet 8 for connection to a source of brake actuating fluid, for example a hydraulic master cylinder, and an outlet 9 for connection to a brake actuator, for example a wheel slave cylinder. The inlet 8 and outlet 9 communicate with a stepped bore 10 formed within the valve body 2. A valve set 11 comprising a valve seat 12 and valve closure member 13 is located within the bore 10 to control communication between the inlet 8 and outlet 9. Operation of the valve set 11 is under the control of a pre-loaded spring 14 and a control member 15. As will be understood by those skilled in the art the valve set 11 provides uninterrupted communication between the inlet 8 and outlet 9 until the pressure in the brake system rises to a "cut-in pressure" and thereafter functions to provide a lower pressure at the outlet than the pressure subsisting at the inlet.

The cut-in pressure at which the control valve begins to operate is determined by the sum of the loading of the spring 14 and the force, in the direction of the arrow A, on the control member 15. In order to render the cut-in pressure sensitive to the pressure subsisting within pressure chamber 5, and thus the loading of the vehicle, the control member 15 is provided at the end remote from the valve set 11 with a pressure plate 16. The upper surface of the pressure plate 16 is subject to atmospheric pressure via a bore 17 formed in the valve body which communicates with a port in the exterior surface of the valve body. The lower surface of the pressure plate 16 is subject to the pressure prevailing within a control chamber 18 formed between a steel cup 19 which forms part of the valve body, and a flexible diaphragm 20 which is sealingly trapped at the periphery thereof between the steel cup 19 and the main part of the body 2.

The diaphragm 20 ensures that the pressure plate 16 is subject to the pressure subsisting within the control chamber 18, but prevents any flow of fluid from the control chamber 18 via the clearance space which exists between the pressure plate 16 and the stepped bore 10.

The control chamber 18 is fluidically connected to the pressure chamber 5 via one or more small orifices 21 formed in the steel cup 19. The size of the or each orifice 21 is carefully controlled to provide a limited communication between the control chamber 18 and the pressure chamber 5 whereby the pressure in chamber 18 follows long-term changes in the pressure within the chamber 5, but is isolated from rapid fluctuations within the pressure chamber 5 caused by, for example, rough road surfaces.

The small size of the or each orifice 21 has the further advantage that should the diaphragm 20 rupture permitting fluid to escape from control chamber 18 to atmosphere via passages 17, the rate of fluid loss from the pressure chamber 5 will be very small, and indeed should be less than the capacity of the pump servicing the self-levelling system whereby no adverse effect on the vehicle suspension will be caused by diaphragm rupture.

It will be appreciated that the above described embodiment of the invention obviates the problems described earlier in connection with GB No. 1304350 in that there is no vulnerable tubing connection between the pressure chamber 5 and the brake pressure control valve, and even in the event of failure of the isolating diaphragm 20 the rate of loss of suspension fluid will be small. Further, the controlled size of the orifice 21 ensures that the brake pressure control valve will not respond to rapid fluctuation in suspension system pressure.

I claim:

1. A brake pressure control valve for use on a vehicle having a pressurized fluid self-levelling suspension system, the valve comprising: a valve body constructed and arranged to be sealingly secured to the wall of a pressure chamber of the suspension system to close an aperture in the wall whereby a portion of the control valve body is located within the pressure chamber and is exposed to the pressure prevailing within the pressure chamber; a valve set located within the valve body to control communication between an inlet connectable to a source of brake actuating fluid and an outlet connectable to a brake actuator; a control member exposed to the pressure prevailing within a control chamber defined within the portion of the valve body located within the pressure chamber, the control member being coupled to the valve set to render operation of the valve set dependent upon the pressure prevailing within the control chamber; and a small orifice fluidically connecting the control chamber to the pressure chamber, said orifice being of a size to provide limited communication between said control chamber and said pressure chamber in order to isolate the former from rapid fluctuations of pressure in the latter.

2. A brake pressure control valve according to claim 1 wherein the control chamber is in part defined by one side of a flexible diaphragm which is exposed through said orifice to the pressure in the pressure chamber and sealingly engages the valve body and fluidically isolates the control chamber from the internal components of the control valve.

3. A brake pressure control valve according to claim 2 wherein the opposite side of said diaphragm defines, in part, another chamber interposed between said valve set and said control chamber, and means venting said another chamber to atmosphere.

4. A brake pressure control valve according to claims 1, 2 or 3 wherein the valve body is adapted to extend through the aperture with at least that part of the valve which defines the control chamber being located within the pressure chamber of the suspension system.

5. A brake pressure control valve according to claims 1, 2 or 3 wherein the valve body includes a stepped bore which houses the internal components of the valve, and the internal components are held captive by a cup which forms one end of the valve and is secured to the valve body.

6. A brake pressure control valve according to claim 1 wherein the valve body includes a blind stepped bore in which the internal components of the valve are housed, the open end of the blind bore being sealingly closed by a flexible diaphragm which forms one wall of the control chamber.

7. A brake pressure control valve according to claim 6 wherein said cup is secured to the valve body to retain said diaphragm in sealing engagement with the valve body.

8. A brake pressure control valve for use on a vehicle having a pressurized fluid self-levelling suspension system, the valve comprising: a valve body constructed and arranged to be sealingly secured to the wall of a pressure chamber of the suspension system to close an aperture in the wall whereby a portion of the control valve is exposed to the pressure prevailing within the pressure chamber; a stepped bore defined within the valve body; a valve set located in the stepped bore to control communication between an inlet connectable to a source of brake actuating fluid and an outlet connectable to a brake actuator; a control member exposed to the pressure prevailing within a control chamber defined within the valve body, and coupled to the valve set to render operation of the valve set dependent upon the pressure prevailing within the control chamber; a cup secured to the valve body and forming one end of the valve, the cup being effective to hold the valve set and control member captive within the stepped bore and itself forming one wall of the control chamber; and a small orifice fluidically connecting the control chamber to the pressure prevailing within the pressure chamber.

9. A brake pressure control valve according to claim 8 wherein the small orifice is formed in said cup.

* * * * *